March 30, 1965
C. P. ROBERTS ETAL
3,175,337
CONTAINER HEADSPACER
Filed Feb. 6, 1963
3 Sheets-Sheet 1
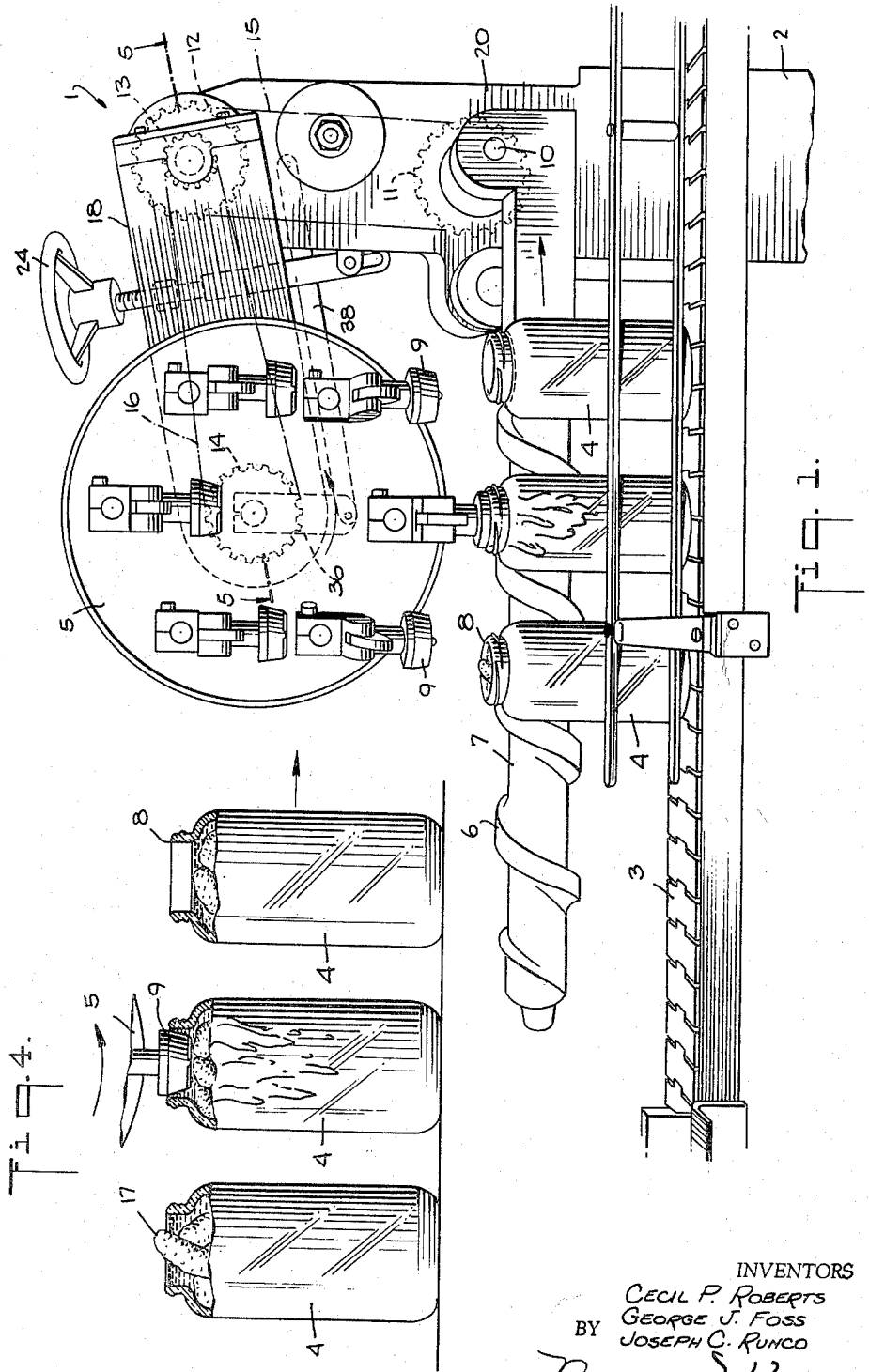
INVENTORS
CECIL P. ROBERTS
GEORGE J. FOSS
JOSEPH C. RUNCO
BY
Norman Holland
ATTORNEY

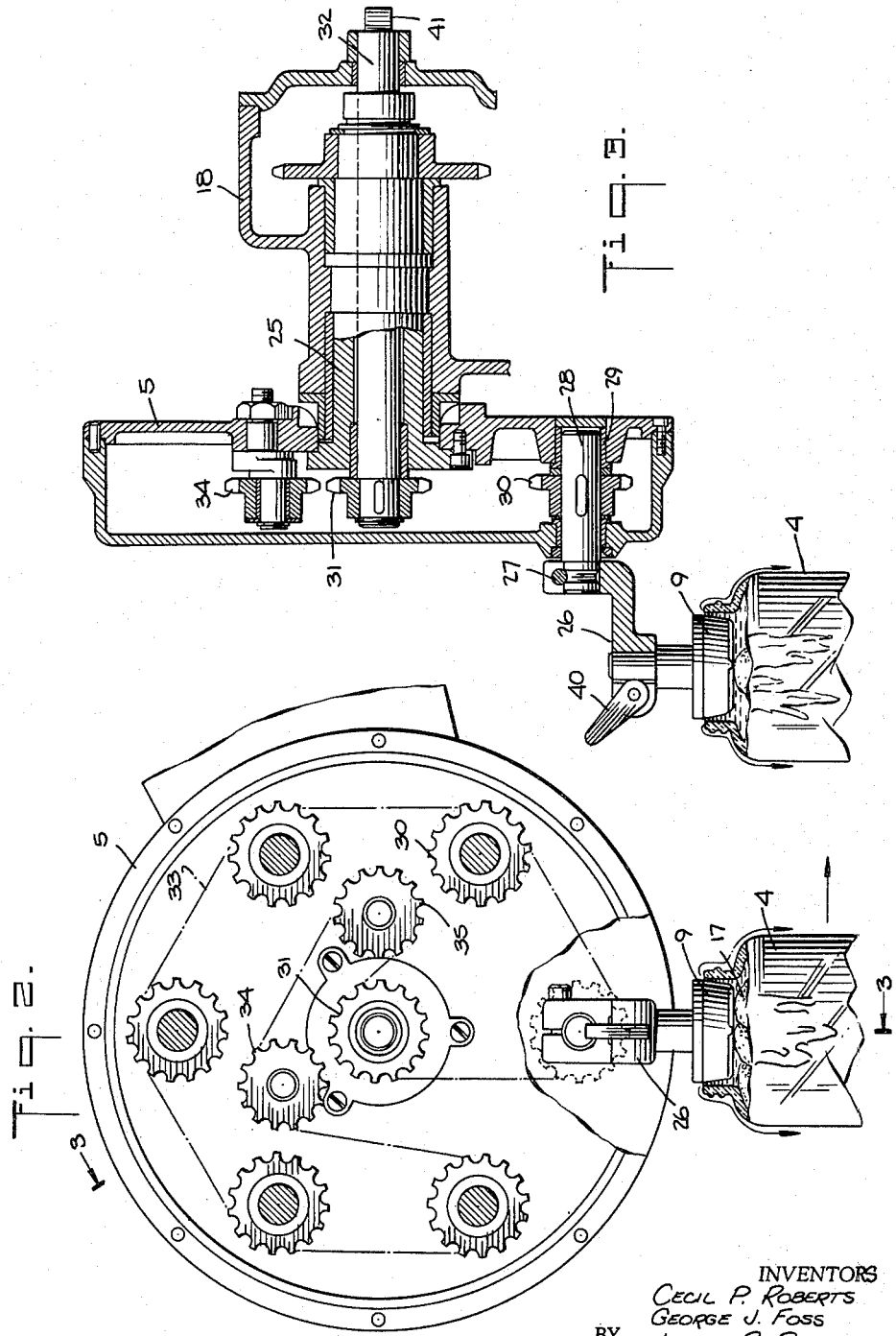

March 30, 1965     C. P. ROBERTS ETAL     3,175,337
CONTAINER HEADSPACER
Filed Feb. 6, 1963                           3 Sheets-Sheet 3

INVENTORS
CECIL P. ROBERTS
GEORGE J. FOSS
BY JOSEPH C. RUNCO

ATTORNEY ly mounted on the vertical frame

United States Patent Office 3,175,337
Patented Mar. 30, 1965

3,175,337
CONTAINER HEADSPACER
Cecil P. Roberts, George J. Foss, and Joseph C. Runco, Lancaster, Ohio, assignors to Anchor Hocking Glass Corporation, Lancaster, Ohio, a corporation of Delaware
Filed Feb. 6, 1963, Ser. No. 256,732
12 Claims. (Cl. 53—124)

The present invention relates to the container sealing art and more specifically to a device for insuring an adequate headspace in filled containers prior to their being sealed with a closure cap.

High speed automatic container filling lines automatically insert a predetermined amount of a product into containers and then pass the filled containers to automatic sealing machines wherein closure caps are applied to the filled containers very often with a vacuum being provided in the containers. After the containers are filled and prior to the sealing operation, containers are often passed through a headspacer which is a device which removes any excess liquid resulting from an overfilling from the container to insure a maximum liquid level in the containers and which also pushes down bulky products such as pickles, frankfurters, onions, olives, beets and the like which tend to rise out of the container when a liquid brine is present or added. It is desirable that each container have a maximum product level to provide a space in the container above the liquid known as a headspace. This headspace prevents interference between excess liquid or other products and the cap during sealing and also facilitates the formation of a vacuum within the container by providing a space in which a condensable vapor may be injected for forming the vacuum. In some containers the headspace is filled with an inert gas after the air has been removed.

The headspacer of the present invention is an improvement upon known types of such devices. Prior headspacers have proven satisfactory for applications where container sizes are substantially constant and where the sealing line operates continuously over long periods while sealing similar containers. Prior headspacers, however, are not satisfactory for use in packaging operations where the container diameters, heights and shapes are being continuously changed so that a rapid and simple adjustment is required for the headspacer. In addition, the present invention provides an efficient and high speed headspacer for use with all types of sealing machines.

Accordingly, an object of the present invention is to provide an improved headspacer.

Another object of the present invention is to provide a precision headspacer which is readily adjusted for differing container sizes and shapes.

Another object of the present invention is to provide a headspacer adaptable for use with a wide range of different sealing machines.

Another object of the present invention is to provide an improved headspacer adapted for use at varying operating speeds.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective view of the headspacer of the present invention;

FIG. 2 is a front elevational view partially in section illustrating the drum of the headspacer of FIG. 1;

FIG. 3 is a vertical sectional view of the drum taken along line 3—3 of FIG. 2;

FIG. 4 is a front elevational view illustrating the liquid displacing and product lowering action of the headspacer;

Figure 5:
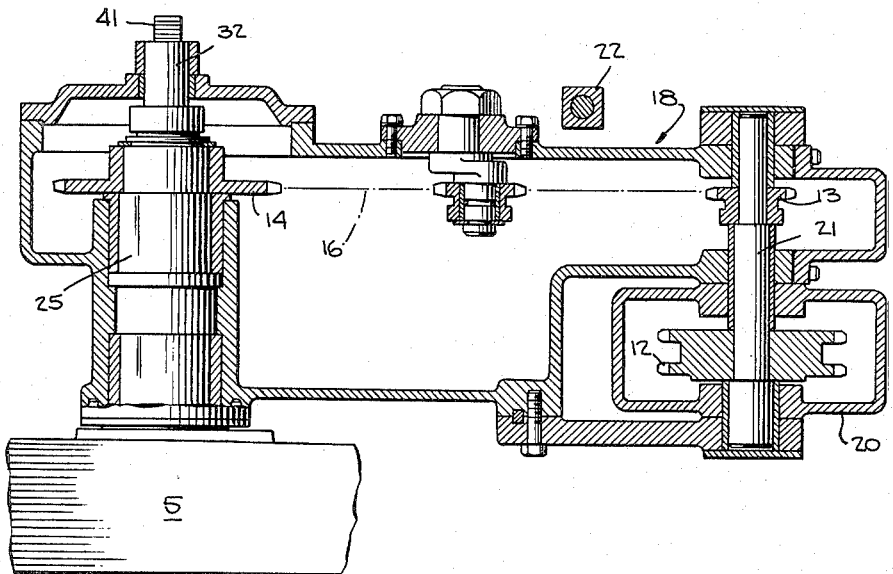
FIG. 5 is a horizontal sectional view of the supporting arm taken along line 5—5 of FIG. 1.

FIG. 1 illustrates a headspacer 1 in accordance with the present invention mounted on a suitable base 2 adjacent a container conveyor 3. The conveyor 3 illustrated may be a connecting conveyor between a container filler and a sealing machine or another device in a sealing line or it may be an integral part of either a filler or a sealing machine.

As illustrated in FIG. 1, a line of containers 4 is moved from left to right beneath the rotating headspacer drum 5 of the headspacer 1. As the containers 4 approach the rotating headspacer drum 5 they are intercepted by a revolving helicoid 6 whose pockets 7 space the containers 4 uniformly on the moving conveyor 3 and synchronize the movement of the containers 4 so that the mouth 8 of each container 4 receives one of the moving plungers 9 on the headspacer drum 5 and permits the plunger 9 to move a predetermined distance into the container mouth 8 as illustrated in FIG. 4.

The entrance of the plunger 9 into the container 4 insures the existence of a headspace of at least a predetermined volume which is the volume of the portion of the plunger which enters the container and also determines the solid product height. If this headspace volume already exists in the container and if the solid products are below the desired level, no liquid will be displaced or product moved. If, on the other hand as illustrated by the left hand container 4 of FIG. 4 the container is filled to overflowing and a product such as the pickle 17 extends above the desired level, the entrance of the plunger 9 will displace the full amount represented by the volume of the inserted plunger 9, and the pickle 17 will be pushed down to the desired level. Where the jar or container is filled only slightly above the desired level, the entrance of a plunger 9 will cause the displacement of sufficient liquid to enlarge the headspace to the desired volume. Similarly, solid products will be pushed down the necessary amount regardless of the liquid height. Containers 4 which are underfilled or having no over-height product will pass through the headspacer without change, however, the use of the headspacer permits the container filling machine to be adjusted on the safe side so that any errors which are made tend to occur on the over-filling side since the headspacer will lower the liquid and solid product level to the desired height.

The above described helicoid 6 which spaces the jars 4 on the conveyor 3 is driven in synchronism with the moving conveyor 3 by a suitable coupling such as a chain and sprocket coupling or a gear train (not shown). A portion of this drive system for the helicoid, such as the horizontal drive shaft 10 of FIG. 1, is used to drive headspacer drum 5 in exact synchronism with both the conveyor 3 and the helicoid 6. Thus, as illustrated in FIG. 1, the drive system for drum 5 comprises four sprockets 11–14 and two connecting chains 15 and 16 which provide a positive coupling between the headspacer drum 5 and driven shaft 10. While a helicoid 6 is illustrated in the preferred embodiment, other container spacers such as a cleated chain or a star wheel may be used for container spacing to precisely center each container 4 beneath the appropriate plunger 9.

In order to facilitate the simultaneous adjustment of the plunger 9 heights, the support arm 18 for the headspacer drum 5 is pivotally mounted on the vertical frame member 20 concentric with the mounting shaft 21 (FIG. 5) for the intermediate drive sprockets 12 and 13. This permits the height of the head spacer drums to be adjusted by the rotation of the support arm 18 about its pivotal mounting without requiring adjustment of the drive chain 16.

Arm 18 is adjustably positioned by control arm 22. An upper portion 42 of the control arm 22 is threadedly connected to a lower portion 43 and is also adjustably coupled to the arm 18 by a nut 23. The nut 23 is attached to the arm 18 by a suitable stud which permits the nut 23 to turn to accommodate itself to the arcuate path of the arm 18 during adjustment. The threads engaging the nut 23 are reversed from the threads connecting the upper portion 42 to the lower portion 43 so that one rotation of the control wheel 24 moves the arm 18 a distance equal to twice the thread pitch thereby giving a fast and convenient height adjustment of the headspacer drum 5.

The lower portion 43 of arm 22 is pivotally mounted by a pin 44 in a slot 45 and this mounting holds the lower portion 43 of arm 22 against rotation while permitting the arm 18 to rise against the force of gravity should the plungers 9 unexpectedly engage an obstruction as they move to their lowermost position.

It will be seen that the above described drive for drum 5 provides a continuous rotation of the drum 5 on a hollow drum mounting shaft 25 mounted in the support arm 18 as illustrated in FIG. 3. In order to provide for an effective fluid displacing action for each individual plunger 9, it is necessary for the plungers 9 to be lowered in a generally vertical position as they enter the filled jars 4. FIGS. 2 and 3 illustrate the means for retaining the plungers 9 in a vertical position. Each of the plungers 9 is mounted on a support bracket 26 which, in turn, is adjustably attached by clamp 27 to the outer end of a support shaft 28 rotatably mounted in bearings 29 in the headspacer drum 5. A sprocket 30 is attached to the central portion of each of the shafts 28 and, in addition, a sprocket 31 is also fixedly mounted on a plunger adjustment shaft 32 which passes through the center of the hollow drum support shaft 25. Each of the sprockets 30 on the plunger support shafts 28 as well as the sprocket 31 on the plunger adjustment shaft 32 have the same number of teeth and are connected by an endless chain 33. Two eccentrically mounted idler sprockets 34 and 35 are included in this system to facilitate the mounting of the endless chain 33 within the headspacer drum and to permit the adjustment of slack in chain 33. Since all of the sprockets 30 and 31 have the same number of teeth, it is apparent that rotation of the drum 5 about the stationary center sprocket 31 will cause all of the plungers 9 to remain in a constant angular alignment with each other and the plane of the conveyor and the container tops.

The individual plungers are first aligned in parallel relation to one another by adjusting their brackets 26 by adjustable clamps 27. The entire group of plungers 9 is now simultaneously adjusted to provide for the continuous vertical position of each plunger 9 by the rotation of the center sprocket 31. Sprocket 31 is adjusted by turning the plunger adjustment shaft 32. This adjustment is facilitated by the square tool engaging end 41 on the adjustment shaft 32.

Figure 6:
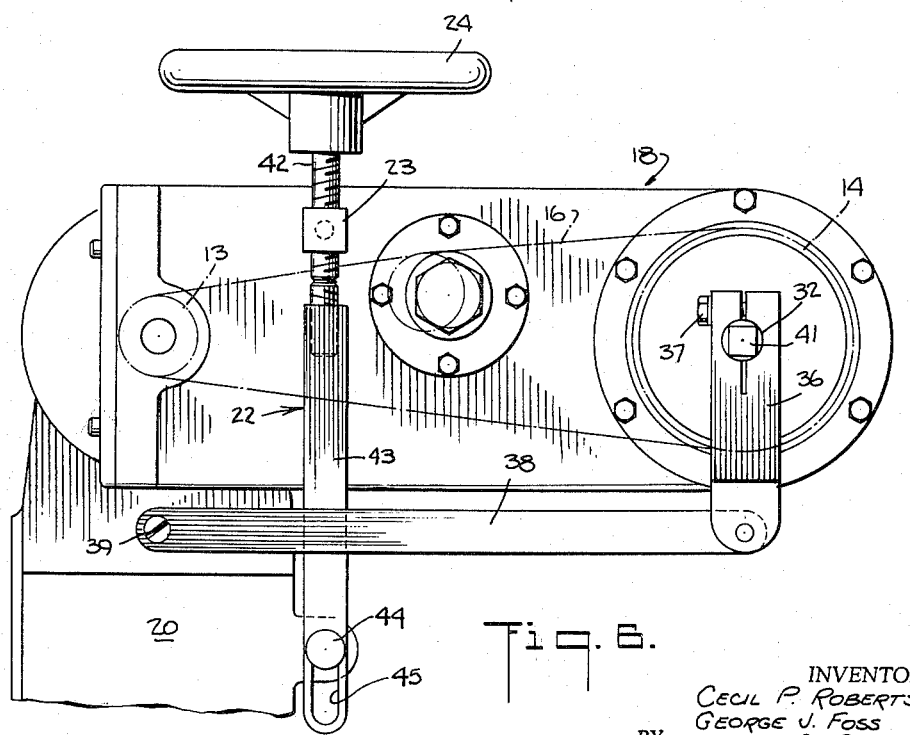
FIG. 6 is a rear elevational view of the support arm.

As best illustrated in FIG. 6, the adjustment shaft 32 is releasably clamped at one end of a stabilizer crank 36 by a bolt 37. The stabilizer crank 36 is pivotally attached at its other end to a stabilizer bar 38. The stabilizer bar 38 is pivotally connected at 39 to the frame member 20. A parallelogram is formed by the frame member 20, the support arm 18, the stabilizer crank 36 and the stabilizer bar 38. Once the plungers 9 have been vertically aligned, the parallelogram including the stabilizer crank 36 and the stabilizer bar 38 keep the plungers 9 vertically aligned during height adjustments of the drum 5.

While the preferred embodiment illustrated herein uses chains and sprockets for the drive means for drum 5, other forms of belt and pulleys may be used as long as they insure a positive drive without slippage.

As illustrated in FIG. 3, one set of the plungers 9 is easily interchangeable for another for differing container sizes and shapes by releasing the clamps 40 which releasably hold the plungers 9 in the support brackets 26.

It will be seen that the above described headspacer provides both an efficient head spacing device which is useful with many types of sealing machines and which is also readily adjusted for varying container sizes and container shapes. The necessary adjustments may be made with no additional parts being required except for a possible interchange of plunger heads where a significant change has been made in the style of the container being sealed. The relative simplicity of the headspacer design permits it to be readily mounted for use with a wide variety of sealing machine types and the accessibility of the adjustment controls facilitates the use of the headspacer by relatively inexperienced personnel so that the machine is practical for use in both large and small packing plants.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. A headspacer for filled containers comprising the combination of means for moving a series of spaced containers, a plurality of displacing members, rotatable means for carrying said members around a closed path in a generally vertical plane, a pivotal mounting for said members on said rotatable means, a pulley connected to each of said displacing members, a stationary pulley mounted at the center of rotation of said rotatable means, and an endless belt interconnecting said pulleys to maintain said displacing members in a predetermined alignment.

2. A headspacer for filled containers comprising the combination of means for moving a line of space containers, a plurality of displacing members, rotatable means for carrying said members around a closed path in a generally vertical plane for registering consecutively with said spaced containers, a sprocket coupled to each of said displacing members, a stationary sprocket mounted at the center of rotation of said rotatable means, and an endless chain interconnecting said sprockets to maintain said displacing members in a predetermined alignment.

3. A headspacer for containers comprising the combination of means for moving a line of spaced containers, a plurality of displacing members, rotatable means for carrying said members around a closed path in a generally vertical plane, a pivotal coupling between said members and said rotatable means, a plurality of pulleys with one coupled to each displacing member, another pulley fixedly mounted at the center of rotation of said rotatable means, an endless belt interconnecting all of said pulleys, and means for adjusting the position of said fixedly mounted pulley.

4. A headspacer for filled open mouthed containers comprising the combination of a plurality of plungers, rotatable means for carrying said plungers around a closed path in a generally vertical plane, means for moving the containers beneath said path, means for spacing the containers on the container moving means whereby said plungers enter the mouths of said containers, a support, a mounting arm for said rotatable means pivotally attached to said support for adjusting the height of said path above said container moving means, pivotal mountings on said rotatable means for said plungers, a pulley coupled to each plunger, a control pulley mounted at the center of rotation of said rotatable means, an endless belt interconnecting said pulleys, a stabilizer crank connected to said control pulley, a stabilizer arm pivotally connected at its opposite ends to said crank and said support, and said crank and said stabilizer arm and said support and said mounting arm forming a parallelogram.

5. A headspacer for filled containers comprising the combination of means for moving a series of spaced containers, a plurality of displacing members, rotatable means for carrying said members around a closed path in a generally vertical plane, a pulley coupled to each displacing member, a stationary pulley mounted at the center of rotation of said rotatable means, and an endless belt interconnecting said pulleys and holding said members oriented in the same direction throughout said closed path.

6. A headspeaker for containers comprising the combination of a plurality of displacing members, rotatable means for carrying said members around a closed path in a generally vertical plane, means for moving the containers beneath said displacing members, means for spacing the containers on said container moving means whereby the containers register consecutively with said displacing members, a pulley connected to each displacing member, a stationary pulley mounted at the center of rotation of said rotatable means, and an endless belt interconnecting said pulleys and maintaining said displacement members generally parallel to each other while moving around the closed path.

7. A headspacer for containers comprising the combination of plurality of displacing members, rotatable means for carrying said members around a closed path in a generally vertical plane, means for pivotally mounting each of said members on said rotatable means, means for moving the containers beneath said displacing members, means for spacing containers on the container moving means whereby the containers register consecutively with said displacing members, a pulley coupled to each displacing member, a pulley fixedly mounted at the center of rotation of said rotatable means, an endless belt interconnecting said pulleys whereby the displacement members are maintained generally parallel to each other while moving around the closed path, and means for adjusting the position of said rotatable means whereby displacing members can register with different sized containers.

8. A headspacer for open mouthed containers comprising the combination of plurality of displacing members, rotatable means for carrying said members around a closed path in a generally vertical plane, means for moving the containers beneath said displacing members, means for spacing the containers on the container moving means whereby the containers register consecutively with said displacing members, means for adjusting the height of the path of said displacing members above said container moving means, a pulley coupled to each displacing member, a control pulley fixedly mounted at the center of rotation of said rotatable means, an endless belt interconnecting said pulleys whereby the displacement members are maintained generally parallel to each other while moving around the closed path, and stabilizing means for holding said control pulley against rotation during an adjustment of the height of the path of the displacing members.

9. A headspacer for displacing a portion of the contents of containers being moved in spaced relation by a conveyor, comprising the combination of a rotating member, a plurality of displacement members mounted on said rotating member for movement through a closed path for consecutive registry with said containers to displace a portion of the contents of the containers, means for maintaining said displacement members oriented in the same direction as said members move throughout the closed path, a support member, and an intermediate member pivotally mounted at one of its ends on said support member and having said rotating member mounted for rotation at its other end whereby said rotating member can be moved toward or away from said conveyor without changing the orientation of said displacing members.

10. A headspacer for displacing a portion of the contents of containers being moved in spaced relation by a conveyor comprising the combination of a rotating member, a plurality of displacement members mounted on said rotating member for movement through a closed path for consecutive registry with said containers to displace a portion of the contents of the containers, a plurality of pulleys each connected to one of said displacement members, a stationary pulley mounted at the center of rotation of said rotating member, an endless belt interconnecting said pulleys for maintaining said displacement members oriented in the same direction as said members move throughout the closed path, a support member, an intermediate member pivotally mounted at one of its ends to said support member and having said rotating member mounted for rotation at its other end whereby said rotating member can be moved toward or away from said conveyor without changing the orientation of said displacement members, and means passing through said intermediate member from said support member for driving said rotating member.

11. A headspacer for displacing a portion of the contents of containers comprising the combination of a rotating member, a plurality of displacing assemblies each of said assemblies including a head and a pulley mounted rotatably on said rotating member for moving through a closed path to displace a portion of the contents of containers, means for moving containers successively into position beneath the heads of said displacing assemblies, a fixed pulley associated with said rotating member, and an endless belt interconnecting said fixed pulley and said displacing assembly pulleys for rotating the assemblies with respect to said rotating member whereby the assemblies are oriented in the same direction throughout their travel in said closed path.

12. In a headspacer for displacing a portion of the contents of spaced containers moving on a conveyor, the improvement which comprises a plurality of members for moving in a closed path to register consecutively with the containers moving on said conveyor, an element associated with each of said members for engaging an endless belt, rotatable means for moving said members through a closed path, means for rotatably mounting said members with respect to said rotatable means, a pulley mounted at the center of rotation of said rotatable means, and an endless belt interconnecting each of said elements and said pulley for holding said members oriented in the same direction throughout their travel about said closed path.

References Cited in the file of this patent
UNITED STATES PATENTS

| | | |
|---|---|---|
| 1,634,723 | Podel | July 5, 1927 |
| 2,226,410 | Podel | Dec. 24, 1940 |
| 2,529,199 | Stover | Nov. 7, 1950 |